6 Sheets—Sheet 1.

H. A. T. EHRHARDT.
SECURING FLANGE AND OTHER JOINTS, &c.

No. 184,599. Patented Nov. 21, 1876.

Witnesses:
N. B. Knight
F. Martin

Inventor:
H. A. T. Ehrhardt
by C. S. Whitman, atty.

6 Sheets—Sheet 2.
H. A. T. EHRHARDT.
SECURING FLANGE AND OTHER JOINTS, &c.
No. 184,599. Patented Nov. 21, 1876.
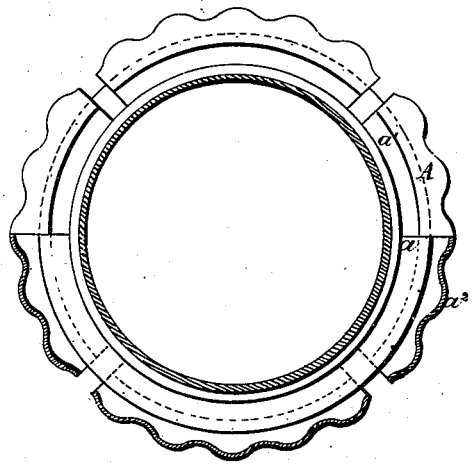
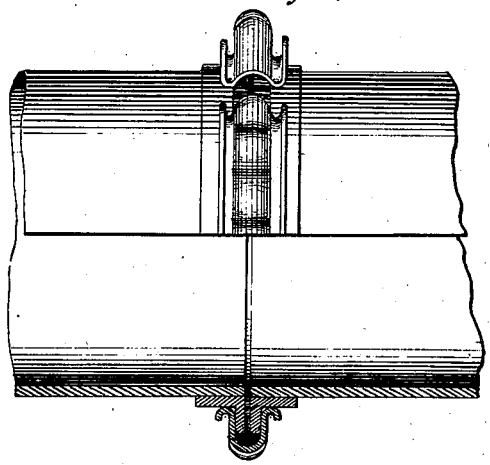
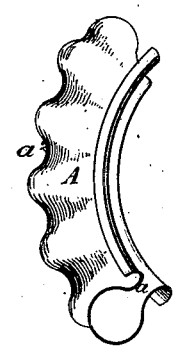
Witnesses.　　　　　　　　Inventor.

H. A. T. EHRHARDT.
SECURING FLANGE AND OTHER JOINTS, &c.

No. 184,599. Patented Nov. 21, 1876.

Witnesses
W. D. Knight
F. Martin

Inventor,
H. A. T. Ehrhardt
by C. S. Whitman atty

H. A. T. EHRHARDT.
SECURING FLANGE AND OTHER JOINTS, &c.
No. 184,599. Patented Nov. 21, 1876.
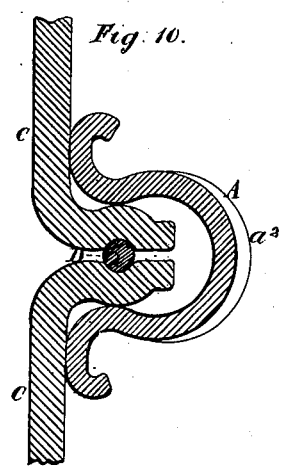
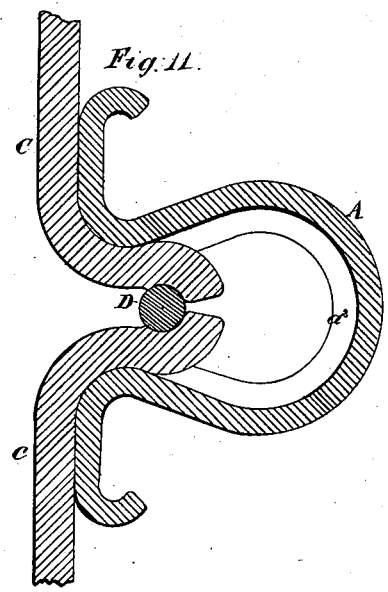
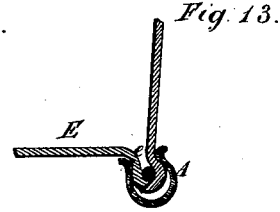
Witnesses:
Inventor:

6 Sheets—Sheet 5.

H. A. T. EHRHARDT.
SECURING FLANGE AND OTHER JOINTS, &c.

No. 184,599. Patented Nov. 21, 1876.

Witnesses

Inventor:

6 Sheets—Sheet 6.
H. A. T. EHRHARDT.
SECURING FLANGE AND OTHER JOINTS, &c.
No. 184,599. Patented Nov. 21, 1876.
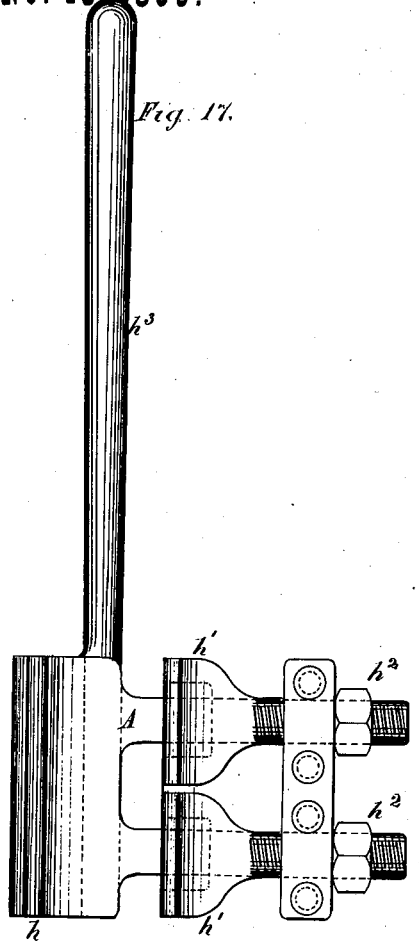
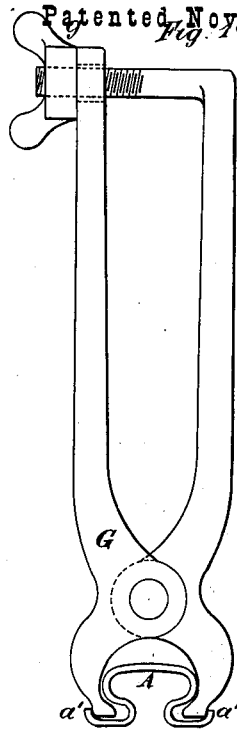
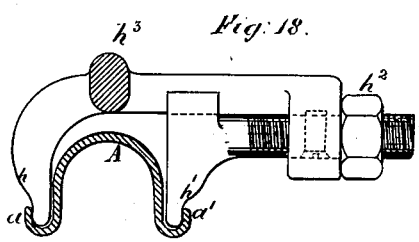
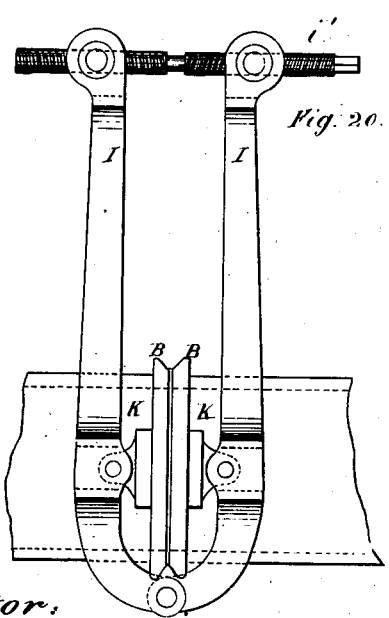
Witnesses:
W. D. Knight
T. Martin
Inventor:
H. A. T. Ehrhardt
by C. Whitman atty.

UNITED STATES PATENT OFFICE.

HEINRICH A. T. EHRHARDT, OF DUSSELDORF, GERMANY.

IMPROVEMENT IN SECURING FLANGE AND OTHER JOINTS, &c.

Specification forming part of Letters Patent No. 184,599, dated November 21, 1876; application filed May 6, 1876.

*To all whom it may concern:*

Be it known that I, HEINRICH AUGUST THEODOR EHRHARDT, of Dusseldorf, in the German Empire, have invented a new device for Securing Flange and other Joints; also applicable for joints of driving-bands, and the like; and do hereby declare that the following description, taken in connection with the accompanying plates of drawings hereinafter referred to, forms a full and exact specification of the same, wherein I have set forth the nature and principles of my said improvement, by which my invention may be distinguished from others of a similar class, together with such parts as I claim and desire to secure by Letters Patent—that is to say:

My invention consists in employing, in place of bolts or screws for securing together the flanges of tubes, boilers, or tank-plates, metal cases, and the like, a steel spring-cramp of trough form, which is made with the space between the edges of the trough somewhat smaller than the thickness of the two flanges which it has to secure, so that on being sprung open somewhat and fitted over the said flanges, the said cramp will nip the flanges firmly together, so as to make them form a perfect joint.

Figure 3:
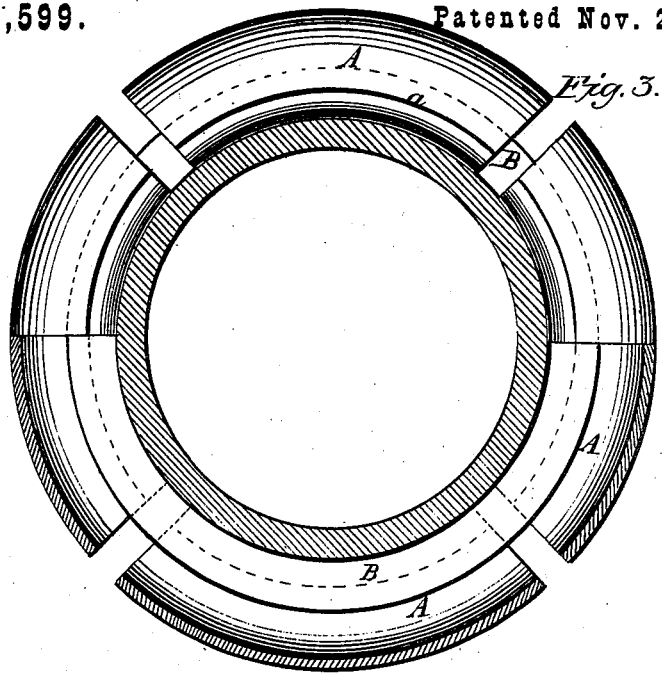
Figure 2:
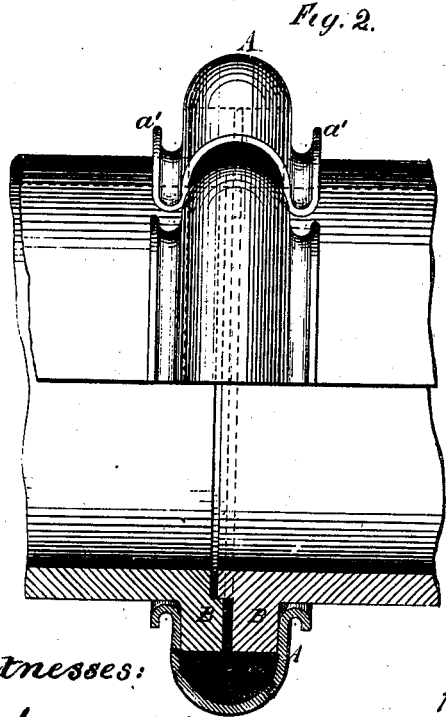
Figure 1:
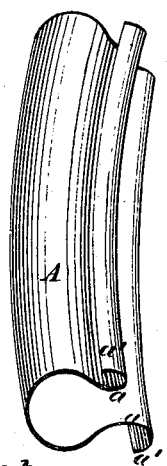

Figures 1 to 3 of the accompanying drawings show one construction of the said cramp, adapted for securing together the flanges of a pipe. Fig. 1 shows a perspective view of the cramp. Fig. 2 shows a side view, partly in section, of the ends of two pipes, the flanges of which are secured together by four such cramps, and Fig. 3 shows an end view, with the cramps partly in section.

Figure 7:
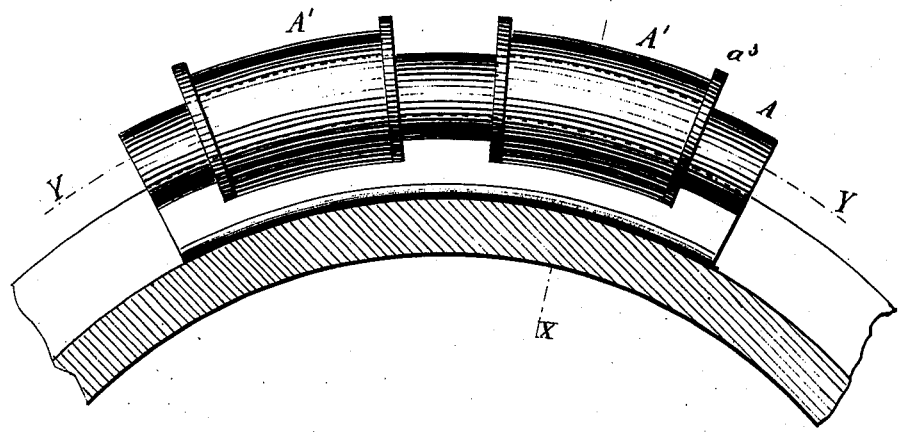
Figure 8:
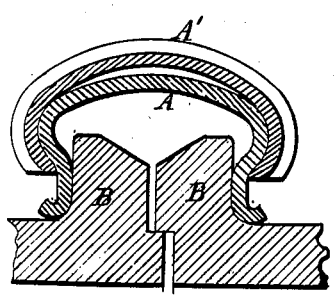
Figure 9:
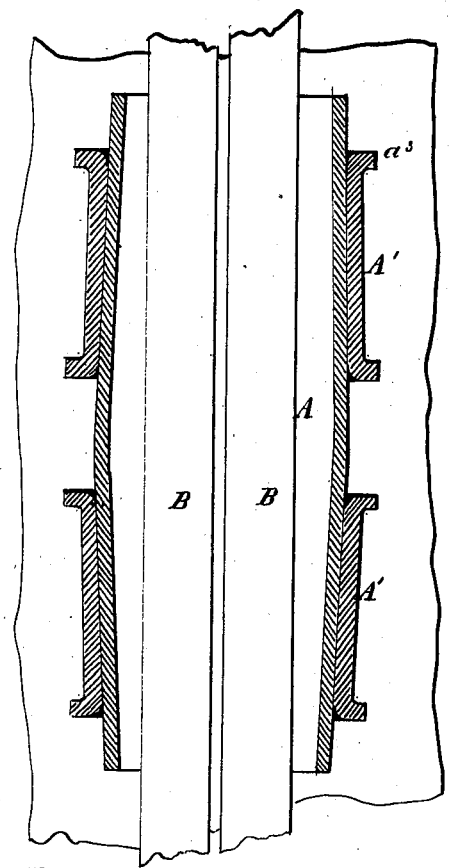
Figure 14:
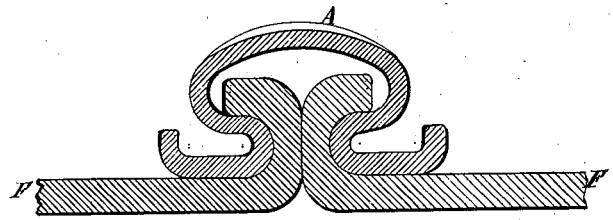
Figure 15:
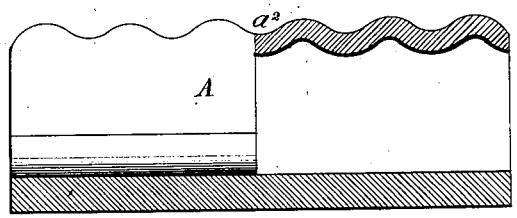
Figure 16:
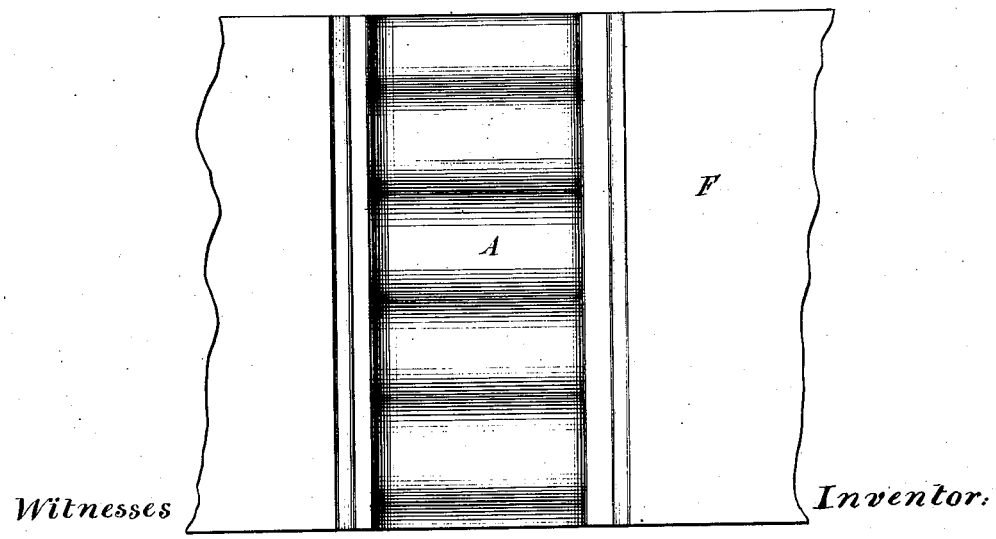

The steel trough-shaped cramps A are, in this case, made of a curved form corresponding with the curvature of the pipe-flange, four such cramps being conveniently used, as shown, for securing the entire circumference of the flanges of moderate-sized pipes; but a greater or less number may, of course, be employed. The edges $a\ a$ of the cramp being made with a less space between them than the united thicknesses of the flanges to be joined, they are sprung open either by hand or by means of instruments, such as are shown at Figs. 17 to 19, in order to enable them to be fitted over the flanges B B of the pipe, which they hold with an elastic force corresponding in intensity to the strength of the steel and the extent to which they are sprung open. To facilitate the opening out of the cramps, they are, by preference, formed with curved lips $a^1\ a^1$, into which the jaws of the expanding instrument are inserted, as indicated at Figs. 18 and 19. In order to afford a maximum holding-power of the cramps with a minimum amount of metal, I sometimes make them with the back corrugated, as shown at Figs. 4, 5, and 6, which represent, respectively, a perspective view of a cramp, and part sectional side view and part sectional end view of two pipe ends secured together by such cramps. Here the cramp A is formed with corrugations $a^2$ at the back running in the direction of the length, and dying out toward the lips $a\ a$, as indicated; or, according to another modification for increasing the strength of the cramp, I arrange them, as shown in Figs. 7, 8, and 9, which show, respectively, a plan, a section on line X X, and a section on line Y Y. In this case the steel cramp A has fitted upon it one or more other cramps, $A^1\ A^1$, which may or may not be formed with strengthening-flanges $a^3$, and which are slid onto A from the ends thereof, the back of the cramp A being, by preference, made to taper slightly from either its middle toward each end, as shown at Fig. 9, or from the one end toward the other, so that $A^1$ may be made to nip A more or less by driving the former to a greater or less extent onto the latter. Figs. 10 to 13 show various adaptations of the cramp for securing flanges of peculiar form. Figs. 10 and 11 show pipe or plate flanges C formed to receive packing-rings D of plastic or elastic material between them, which is compressed by the application of the cramps A A, so as to form a fluid or gas-tight joint, the cramps being made with corrugations $a^2$, as already explained. Fig. 12 shows a side view, and Fig. 13 a cross-section, of a straight cramp, A, adapted for securing the lids or sides of metal cases E, these being formed with projecting rims or flanges, which may either be curved, as shown at $e$, with packing inserted between them, or they may be flat. Figs. 14 to 16 show the application of the cramp A for securing together the two ends of a driving or traveling belt, strap, or band, F. Fig. 14 shows a cross-section, Fig. 15 shows a side view, partly in section, and Fig. 16 shows a plan. The cramp A being expanded by the tongs G, as shown at Fig. 19, the two ends of the belt F are inserted sufficiently for them to turn over to each side, so that on releasing the cramp by unscrewing the nut $g$ of the tongs G, the cramp will securely nip the two ends of the strap together. Fig. 17 shows a plan, and Fig. 18 shows a side view, of an instrument, H, suitable for expanding the cramps when these are of considerable length and strength, the jaws $h$ $h^1$ being inserted into the lips $a^1$ of the cramp A, and the jaws $h^1$ then made to recede from $h$ by turning the nuts $h^2$. $h^3$ is a handle for conveniently holding the instrument and cramp. Fig. 20 shows an instrument, I, which may, in some cases, be useful for forcing the two flanges B B of a pipe together before putting on the cramps. It consists of two levers, I I, hinged together at $i$, and moved to or from each other at their other ends by a right and left handed screw, $i^3$. K K are cushions that are made to press against the flanges B, so as to force them together by the action of the screw $i^1$.

Having thus described the nature of my invention, and in what manner the same is to be performed, I wish it to be understood that I make no claim to the before-described instruments for expanding the cramps, or pressing together the flanges; but what I claim is—

1. The steel trough-shaped spring-cramp A, for securing together flanges by the pressure of its lips $a$ $a$ when slightly expanded, substantially as herein described.

2. A steel trough-shaped spring-cramp A, for securing together circular flanges, formed with a longitudinal curvature corresponding to the curvature of the flanges, substantially as herein described.

3. In combination with a steel trough-shaped cramp A, the curved lips $a^1$, substantially as and for the purposes described.

In testimony whereof I have signed my name to this specification in the presence of two subscribing witnesses this 16th day of March, 1876.

HEINRICH AUGUST THEODOR EHRHARDT.

Witnesses:
 CHAS. MAY,
 H. LEWIS.